United States Patent
Shinmiya

[11] Patent Number: 5,909,585
[45] Date of Patent: *Jun. 1, 1999

[54] PORTABLE REMOTE TERMINAL IN WHICH ITS CLOCK FREQUENCY IS SWITCHED

[75] Inventor: Kazumi Shinmiya, Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/714,996

[22] Filed: Sep. 17, 1996

[30] Foreign Application Priority Data

Feb. 21, 1996 [JP] Japan .................................. 8-033492

[51] Int. Cl.$^6$ ...................................... G06F 15/16
[52] U.S. Cl. ........................ 395/750.04; 395/750.08; 395/735; 395/740
[58] Field of Search ...................... 395/750, 282, 395/283, 556, 559, 733, 750.04, 750.08, 735, 740, 560

[56] References Cited

U.S. PATENT DOCUMENTS

| | | | |
|---|---|---|---|
| 5,224,152 | 6/1993 | Harte | 379/59 |
| 5,428,820 | 6/1995 | Okada et al. | 455/38.3 |
| 5,511,203 | 4/1996 | Wisor et al. | 395/750.08 |
| 5,560,017 | 9/1996 | Barrett et al. | 395/733 |
| 5,564,015 | 10/1996 | Bunnell | 395/184.01 |
| 5,623,677 | 4/1997 | Townsley et al. | 395/750 |
| 5,625,311 | 4/1997 | Nakatu | 329/293 |
| 5,625,826 | 4/1997 | Atkinson | 395/750 |
| 5,628,001 | 5/1997 | Cepuran | 395/556 |
| 5,630,148 | 5/1997 | Norris | 395/750 |
| 5,632,040 | 5/1997 | Nakajima | 395/750.05 |
| 5,655,127 | 8/1997 | Rabe et al. | 395/750.04 |
| 5,664,205 | 9/1997 | O'Brien et al. | 395/0 |
| 5,669,003 | 9/1997 | Carmean et al. | 395/750.04 |
| 5,726,636 | 3/1998 | Hayes, Jr. | 340/636 |
| 5,768,602 | 6/1998 | Dhuey | 395/750.04 |

FOREIGN PATENT DOCUMENTS

6-232797   9/1994   Japan .

Primary Examiner—Ayaz R. Sheikh
Assistant Examiner—Raymond N Phan
Attorney, Agent, or Firm—Burns, Doane, Swecker & Mathis, L.L.P.

[57] ABSTRACT

A portable terminal comprising a state monitoring portion for monitoring an operating state of a microprocessor in a main control portion, and for increasing a clock frequency when the microprocessor conducts software processing in the main control portion, and for decreasing a clock frequency to supply the minimum operating clock for the microprocessor enough to operate when the microprocessor does not conducts the software processing. The present invention can save the power of the portable terminal effectively.

11 Claims, 7 Drawing Sheets

PORTABLE REMOTE TERMINAL IN WHICH ITS CLOCK FREQUENCY IS SWITCHED

FIELD OF THE INVENTION

The invention relates to a portable terminal such as a portable telephone, for example, and more specifically it relates to a power-saving portable terminal which can be used for a long time.

DESCRIPTION OF THE PRIOR ART

Figure 6:
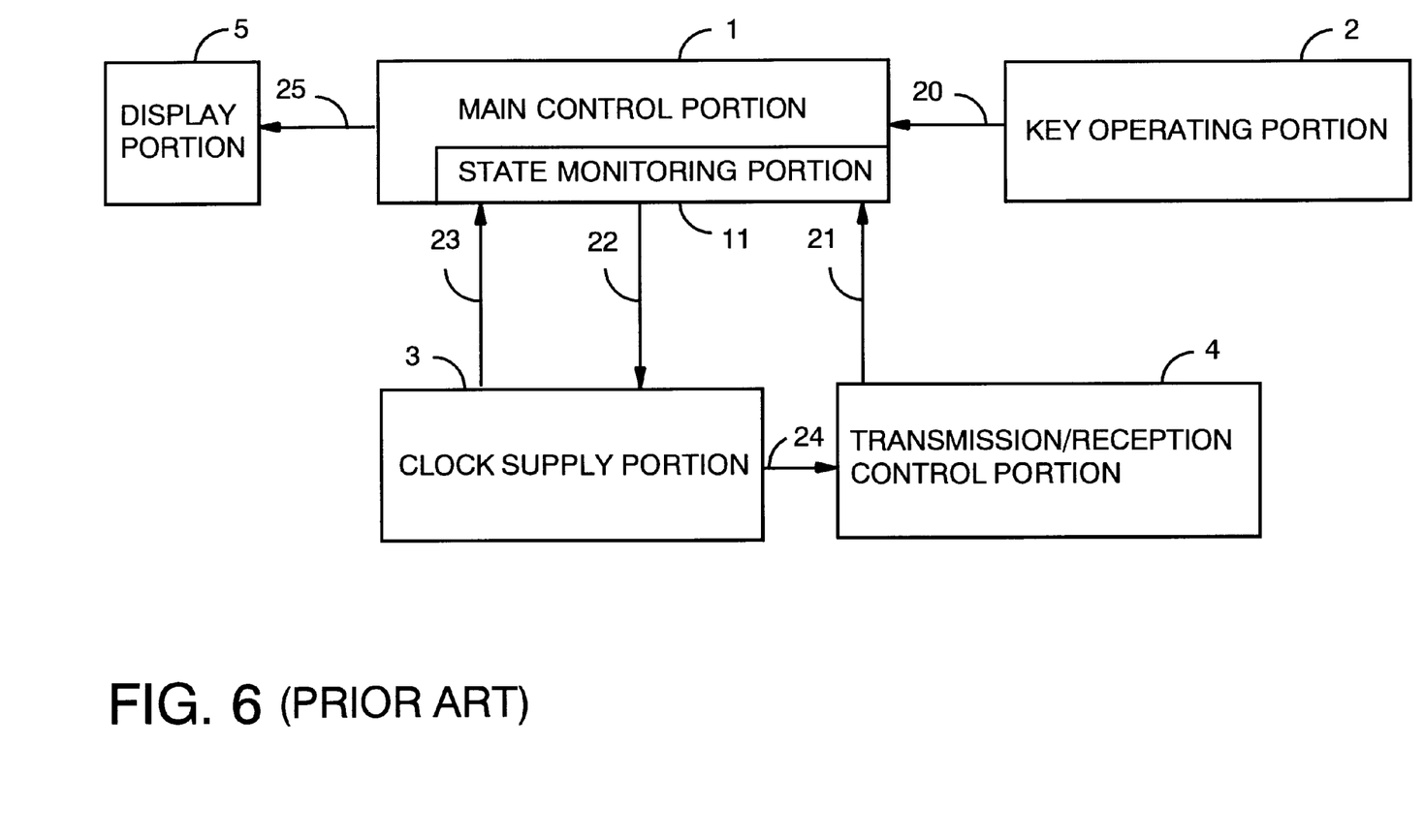
FIG. 6 is a block diagram of a construction of a conventional portable terminal.
Figure 7:
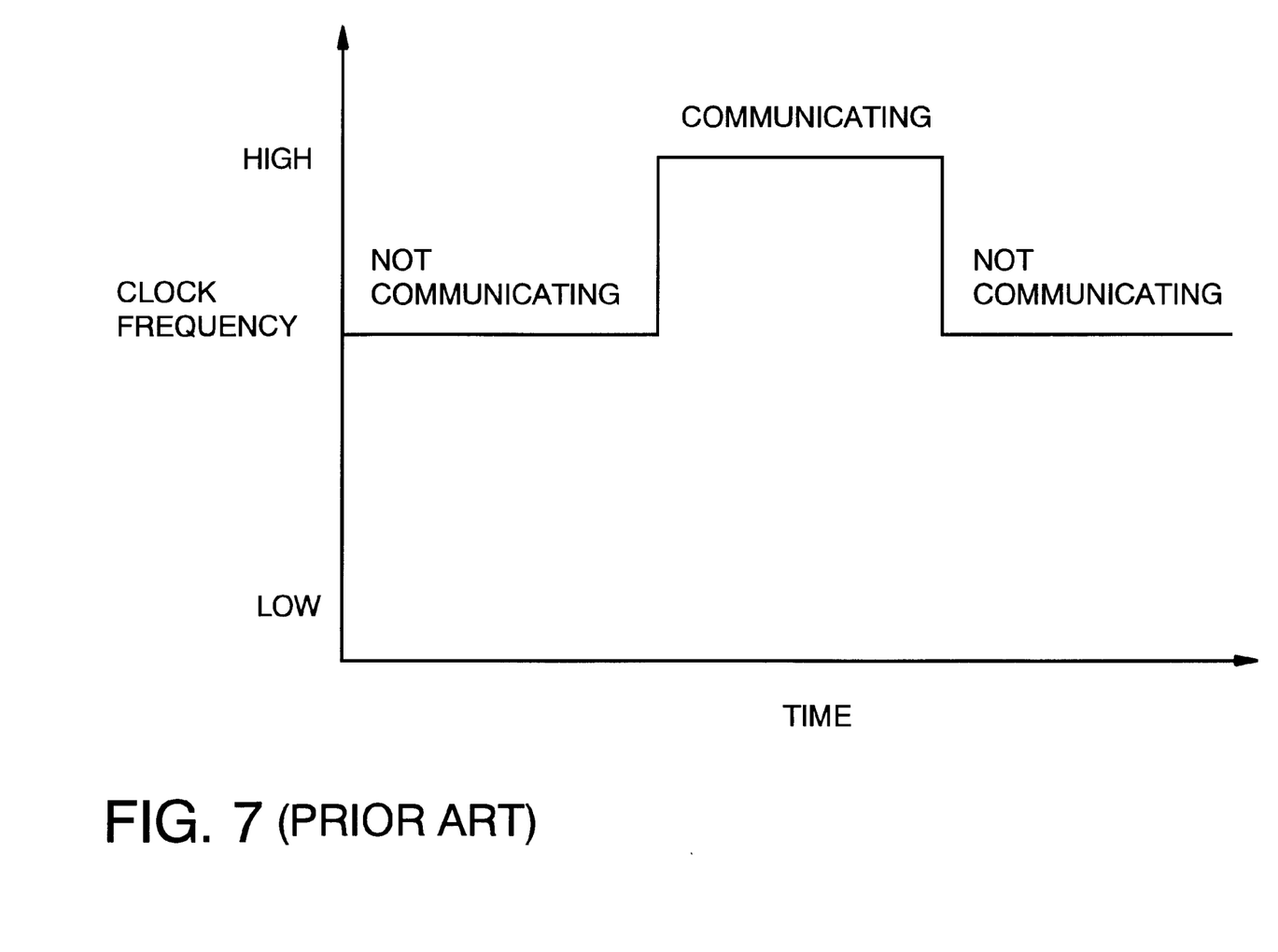
FIG. 7 is a diagram for explaining a timing chart when the state monitoring portion shown in FIG. 6 provides a clock frequency, which is supplied to a main control portion, to the clock supply portion.

FIG. 6 is a block diagram showing a constitution of a portable terminal disclosed in a Japanese laid-open patent publication, 6-232797/94. In FIG. 6, the portable terminal comprises a main control portion 1 having a microprocessor (not illustrated), for controlling the whole functions of the portable terminal, a key operating portion 2, a clock supply portion 3, a transmission/reception control portion 4 having a private microprocessor (not illustrated) (for simplification, it is assumed here that a microprocessor is used for the transmission/reception control portion, although a logic circuit such as a DSP may be used instead of a microprocessor, depending on the circuit size), a display portion 5. The portable terminal further comprises a state monitoring portion 11, which shares the microprocessor with the main control portion 1, for monitoring communicating state of this portable terminal. A key input signal 20 is outputted from the key operating portion 2, a state informing signal 21 is outputted from the transmission/reception control portion 4 to the state monitoring portion 11, a clock switching signal 22 is outputted from the state monitoring portion 11 to the clock supply portion 3, a main control clock 23 is supplied by the clock supply portion 3 to the microprocessor of the main control portion 1, a transmission/reception clock 24 is supplied by the clock supply portion 3 to the microprocessor of the transmission/reception control portion 4, and a display signal 25 is outputted from the main control portion 1 to the display portion 5. FIG. 7 is a timing chart for explaining an operation for switching a frequency of the main control clock 23 in response to an indications of the clock switching signal 22.

An operation of the portable terminal is explained next using FIG. 6. The state monitoring portion 11 judges whether or not this portable terminal is communicating by monitoring an operating state of the main control portion 1 where the key input signal 20 and the state informing signal 21 and so on are inputted from the key operating portion 2 and the transmission/reception control portion 4 and so on, respectively. Based on this judgement, at a non-communicating state, the state monitoring portion 11 sends the clock switching signal 22 to the clock supply portion 3 so that the clock supply portion 3 sets a frequency of the transmission/reception clock 24 supplied to the transmission/reception control portion 4 to an extent that the portable terminal can receive a radio waveform from outside (not illustrated) (hereinafter, referred to as a receivable frequency), and a frequency of the main control clock 23 supplied to the main control portion 1 to the extent that the portable terminal can operate during the non-communicating state (hereinafter, referred to as a non-communicating frequency).

During a communicating state, the state monitoring portion 11 sends the clock switching signal 22 to the clock supply portion 3 so that the clock supply portion 3 sets a frequency of the transmission/reception clock 24 supplied to the transmission/reception control portion 4 to an extent that the portable terminal can communicate with outside (hereinafter, referred to as a communicable frequency), and a frequency of the main control clock 23 supplied to the main control portion 1 to an extent that the portable terminal can operate at the communicating state (hereinafter, referred to as a communicating frequency). Further, the state monitoring portion 11 detects that a state of the main control portion 1 has hanged to an end of communication via the state informing signal 21 received from the transmission/reception control portion 4, the state monitoring portion 11 sends the clock switching signal 22 to the clock supply portion 3 so that the clock supply portion 3 changes the frequency of the transmission/reception clock 24 to the receivable frequency again, and changes the frequency of the main control clock 23 to the non-communicating frequency.

The main control portion 1 conducts function control processes using its own microprocessor. The following are main function control processes which the main control portion 1 conducts.

(1) A key control process for processing a key input signal in response to the key input signal 20 from the key operating portion 2.

(2) A display process for displaying a communication result and so on, by outputting the display signal 25 to the display portion 5.

(3) A communication control process for instructing the transmission/reception control portion 4 to start/end the communication with outside apparatus.

(4) A communication monitoring process for monitoring the communication between the transmission/reception control portion 4 and outside apparatus.

Further, the state monitoring portion 11 within the main control portion 1 conducts the following process.

(5) A state monitoring process for monitoring above processes (1)~(4).

In other words, the frequency of the main control clock 23 is supplied to the main control portion 1 from the clock supply portion 3 in the above mentioned function control processes (1)~(5) during the communication. The frequency is referred to as the communicating frequency, which is needed to operate the microprocessor in the main control portion 1 to conduct the above mentioned function control processes (1)~(5) during the communication. Further, the frequency of the main control clock 23 is supplied to the main control portion 1 from the clock supplying portion 3 in the above mentioned function control processes (1), (2), and (5) during the non-communicating. The frequency is referred to as a non-communicating frequency, which is needed to operate the microprocessor in the main control portion 1 to conduct the above mentioned function control processes (1), (2), and (5) during the non-communication. More concretely, when the state monitoring portion 11 indicates that the state is in the non-communicating, the clock supply portion 3 sets the frequency of the main control clock 23 to 10 MHz and supplies it to the main control portion 1. While, when the state monitoring portion 11 indicates the state is the communicating frequency, the clock supply portion 3 sets the frequency of the main control clock 23 to 12 MHz and supplies it to the main control portion 1.

The state monitoring portion 11 sends the clock switching signal 22 to the clock supply portion 3 so that the clock supply portion 3 switches the frequency of the transmission/reception clock 24, which is supplied to the transmission/reception control portion 4 shown in FIG. 6, to the receivable frequency or the communicable frequency according to respective communicating state and non-communicating state.

As explained in the above operation, in the conventional portable terminal as shown in FIG. 7, the clock supply portion 3 sets the frequency of the main control clock 23 supplied to the main control portion 1 to the non-communicating frequency during the non-communicating state, and to the communicating frequency during the communicating state, in response to the clock switching signal 22 outputted from the state monitoring portion 11, which can save the power consumption of the portable terminals.

Since the conventional portable terminal operates as explained above, there have been the following problems.

First, the conventional portable terminal aims to save power by setting the frequency of the main control clock 23 supplied to the main control portion 1 by the clock supply portion 3 such as the non-communicating frequency during the non-communicating state as shown in FIG. 7, via the clock switching signal 22 outputted from the state monitoring portion 11. However, the non-communicating frequency can not be lower than a predetermined frequency which is enough to correspond to the above mentioned function control process (1), that is, the key control process for processing the key input signal 20 received from the key operating portion 2, or to the above mentioned function control process (2), that is, the display process for outputting the display signal 25 to the display portion 5, and so on. Therefore, during the non-communicating state, the conventional portable terminal wastes a large amount of power, when the above mentioned key control process or the display process is not conducted.

Second, in the conventional portable terminal, the frequency of the main control clock 23 supplied to the main control portion 1 by the clock supply portion 3 is set to the communicating frequency all the time during the communicating state as shown in FIG. 7, via the clock switching signal 22 outputted from the state monitoring portion 11. However, even during the communicating state, the non-communicating frequency is higher for the operation, unless the software processes corresponding to the above mentioned function control processes (1)~(4) of the main control portion 1 are being conducted. In this case, the conventional portable terminal wastes a large amount of power, because the main control clock 23 having the communicating frequency is always supplied to the main control portion 1 during the communicating state.

It is an object of the present invention to provide a power-saving portable terminal by supplying a clock having a frequency required for operation of the main control portion to the microprocessor in the main control portion, regardless of the communicating/non-communicating state.

SUMMARY OF THE INVENTION

According to one aspect of the invention, a portable terminal in which its clock frequency is switched comprises a main controlling portion having a software processing portion using a microprocessor in the main controlling portion according to an interruption, a clock supply portion for supplying to the main controlling portion a clock signal which causes the microprocessor to operate, and a state monitoring portion for monitoring an operating state of the software processing portion, and wherein state monitoring portion sends a clock switching signal to the clock supply portion so that the clock supply portion sets a frequency of the clock signal to high when the software processing is being conducted and sets a frequency of the clock signal to low when the software processing is not being conducted.

Preferably, the state monitoring portion changes the clock frequency up and down according to respective software operating load caused by the software processing portion.

Preferably, the state monitoring portion shares a microprocessor with the software processing portion, and when no processing are conducted by the microprocessor for the software processing portion, the clock supply portion sets the minimum clock frequency which is enough for the state monitoring portion to operate.

According to a further aspect of the invention, a portable terminal in which its clock frequency is switched comprises a main controlling portion having a software processing portion using a microprocessor in the main controlling portion according to an interruption, a clock supply portion for supplying to the main controlling portion a clock signal which causes the microprocessor to operate, and a state monitoring portion for monitoring whether the microprocessor accesses an external memory, wherein the state monitoring portion sends a clock switching signal to the clock supply portion so that the clock supply portion sets a frequency of the clock signal to high when the microprocessor accesses an external memory and sets a frequency of the clock signal to low when the microprocessor does not access the external memory.

Preferably, the clock supply portion sets the minimum clock frequency which is enough for the state monitoring portion to operate, when the microprocessor does not access the external memory.

DETAILED DESCRIPTION OF THE PREFERRED EMBODIMENTS

Embodiment 1

Figure 1:
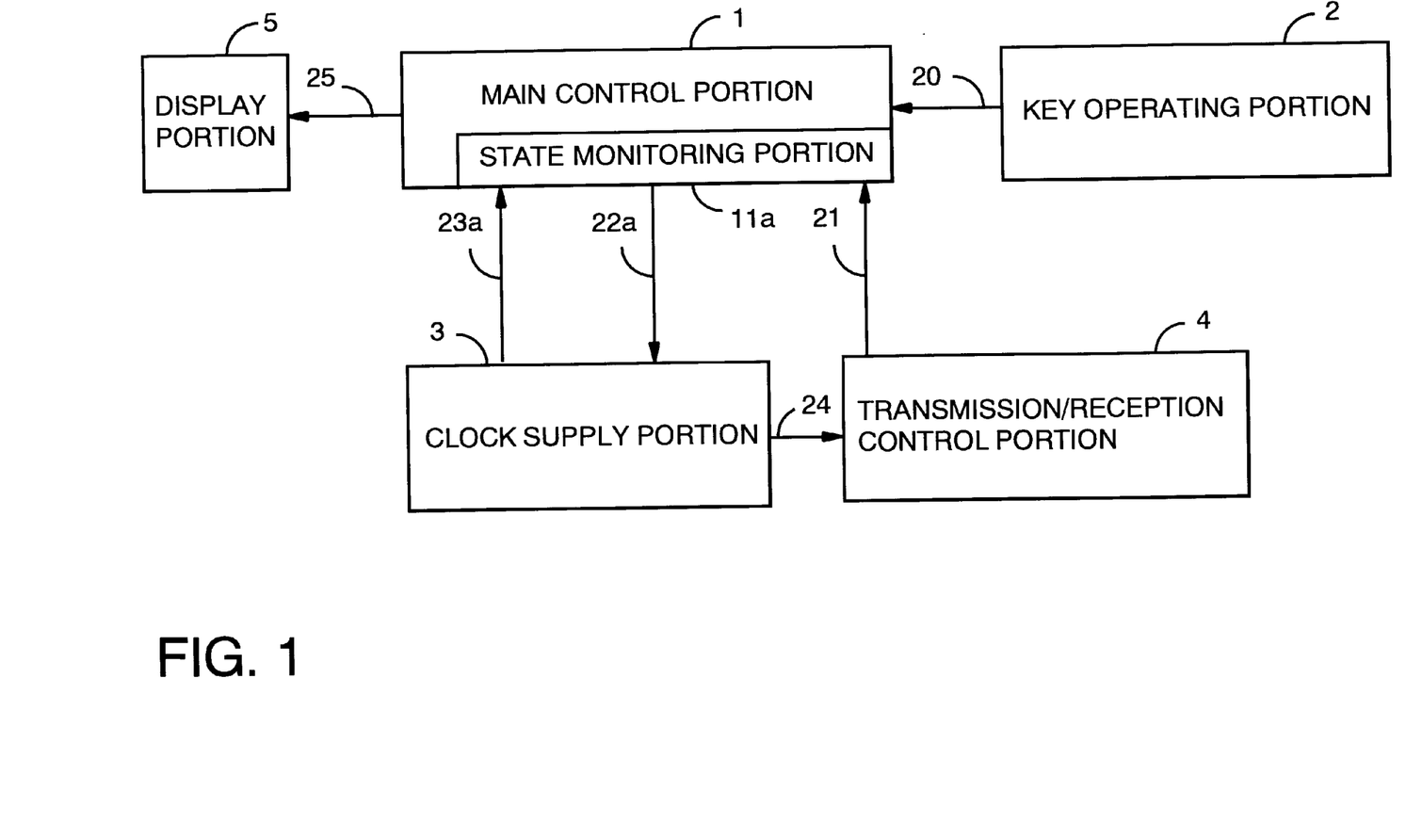
FIG. 1 is a block diagram showing a construction of a portable terminal of a first embodiment of the present invention.
Figure 2:
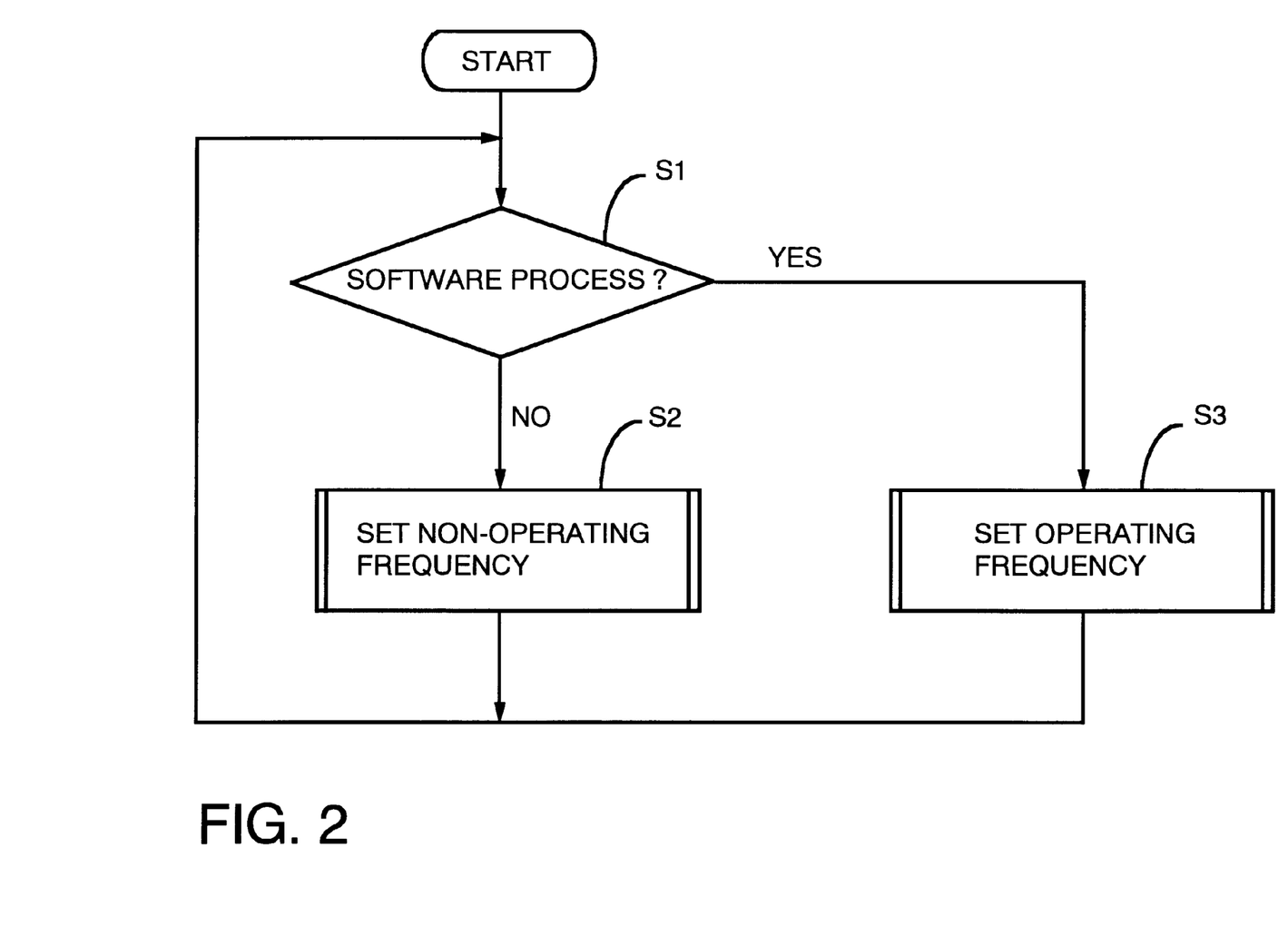
FIG. 2 is a flow chart for explaining an operation of a state monitoring portion shown in FIG. 1.
Figure 3:
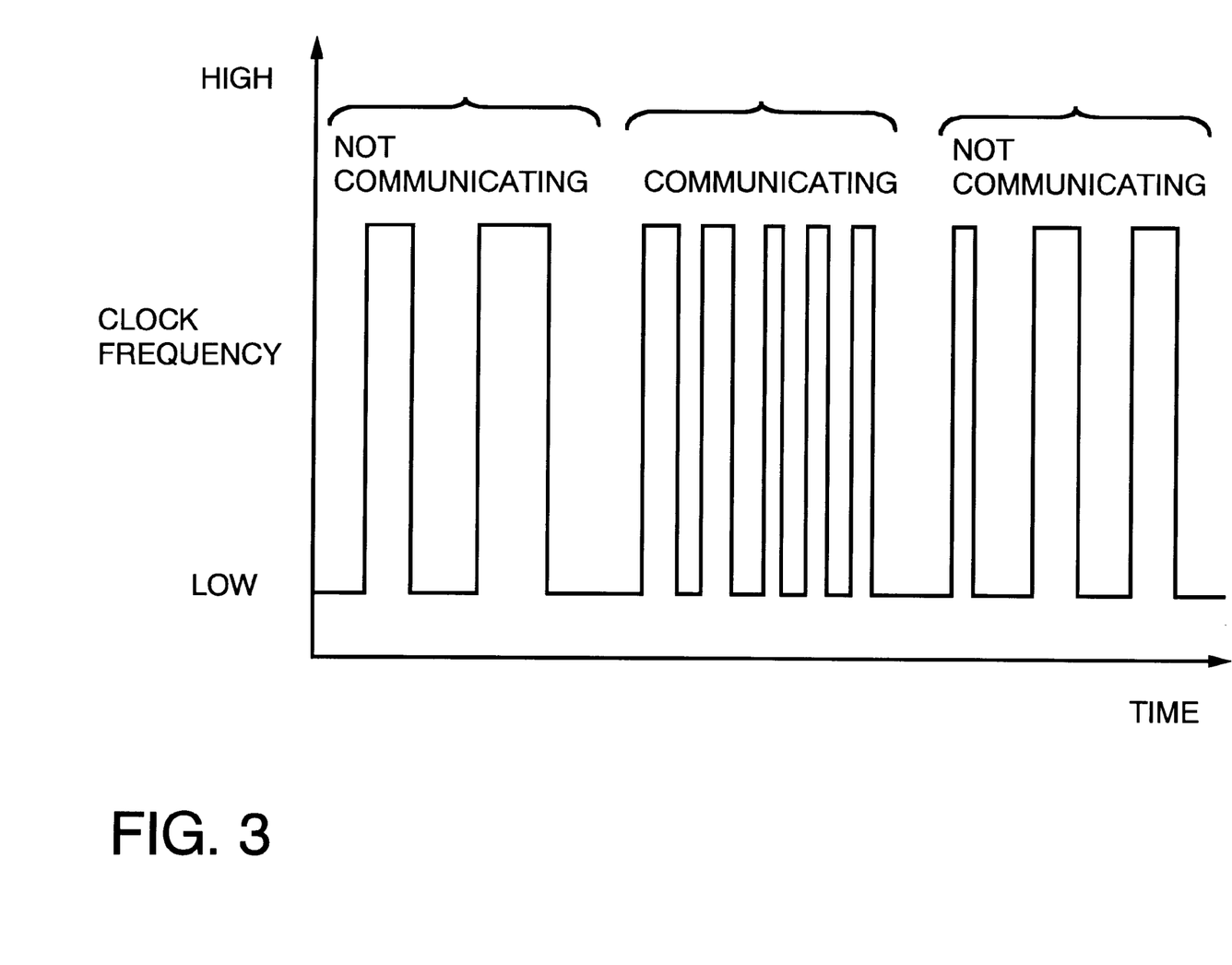
FIG. 3 is a diagram for explaining a timing chart when the state monitoring portion shown in FIG. 1 provides a clock frequency, which is supplied to a main control portion, to the clock supply portion.

A first embodiment of the present invention is explained below using FIGS. 1~3. FIG. 1 is a block diagram showing a construction of a portable terminal of the present invention. Elements commonly numbered in FIG. 1 and FIG. 6 are not provided with a detailed explanation here, because those elements are described above in connection with FIG. 1. In FIG. 1, a state monitoring portion 11a differs from the state monitoring portion 11 of FIG. 6 in that the main control clock 23a is switched in response to the clock switching signal 22a. That is, the main control clock 23a is controlled more finely than that of the main control clock 23 shown in FIG. 6 as explained below. FIG. 2 is a flow chart for explaining an operation of the state monitoring portion 11a. FIG. 3 is a diagram for explaining an operation of the state monitoring portion 11a so that the frequency of the main control clock 23a supplied from the clock supply portion 3 is finely controlled in response to a clock switching signal 22a.

The operation of the portable terminal of the present embodiment is explained below. The switching timing of the state monitoring portion 11a for switching a frequency of a transmission/reception clock 24, which is supplied to a transmission/reception control portion 4, to one of a receivable frequency or a communicable frequency via the clock switching signal 22a is the same as that of shown in FIG. 7.

The state monitoring portion 11a shown in FIG. 1 differs from the state monitoring portion 11 shown in FIG. 6 in that the state monitoring portion 11a sets the frequency of the main control clock 23a supplied to the main control portion 1 to one of an operating frequency or a non-operating frequency via the clock supply portion 3, instead setting one of the communicating frequency or the non-communicating frequency. The operating frequency and the non-operating frequency are defined below.

The operating frequency is a frequency necessary for a main control portion 1 to conduct the above mentioned function control processes (1)~(4) using its own microprocessor.

The non-operating frequency is a frequency necessary for the state monitoring portion 11a only to conduct the above mentioned function control process (5) using the microprocessor which is commonly used by the main control portion 1.

Next, an operation of the state monitoring portion 11a is explained using FIG. 2, where the state monitoring portion 11a sends the clock switching signal 22a to the clock supply portion 3 so that the clock supply portion 3 sets the frequency of the main control clock 23a.

At a step S1, the state monitoring portion 11a judges whether or not the main control portion 1 conducts the above mentioned function control processes (1)~(4). In case that the main control portion 1 does not conduct the above mentioned function control processes (1)~(4), the state monitoring portion 11a goes to a step S2. While in case that the main control portion 1 conducts the above mentioned function control processes (1)~(4), the state monitoring portion 11a goes to a step S3. The state monitoring portion 11a monitors each starting of software processes according to the above mentioned function control processes (1)~(4) of the main control portion 1 by interrupting signal received from an operating system (hereinafter, referred to as OS) for driving software in the main control portion 1, as follows, for example, by detecting an interrupt starting by a key input signal 20 inputted from a key operating portion 2, or by detecting starting of tasks possessed by a task queue in the OS.

At the step S2, the state monitoring portion 11a sends the clock switching signal 22a to the clock supply portion 3 so that the clock supply portion 3 sets the frequency of the main control clock 23a supplied to the main control portion 1 as a non-operating frequency, then, goes to the step S1.

In this way, the frequency of the main control clock 23a supplied to the main control portion 1 is set as a non-operating frequency. In this case, since the only software process which operates using the microprocessor in the main control portion 1 is the state monitoring process of the above mentioned function control process (5) conducted by the state monitoring portion 11a, the main control clock 23a having the non-operating frequency is enough for the operation. At the step S3, the state monitoring portion 11a sends the clock switching signal 22a to the clock supply portion 3 so that the clock supply portion 3 sets the frequency of the main control clock 23a supplied to the main control portion 1 as an operating frequency, then, goes to the step S1. In this state, the microprocessor in the main control portion 1 can conduct not only the above mentioned state monitoring process of the function control process (5) conducted by the state monitoring portion 11a, but also the above mentioned function control processes (1)~(4).

The operation mentioned above is concretely explained using FIG. 3. During the non-communicating state in the prior art, the non-communicating frequency is always supplied to the main control portion 1 which is enough to conduct the above mentioned function control processes (1) and (2) in addition to the above mentioned function control process (5) as shown in FIG. 7 of the prior art. The state monitoring portion 11a of the present embodiment, on the other hand, sends the clock switching signal 22a to the clock supply portion 3 so that the clock supply portion 3 sets the frequency of the main control clock 23a supplied to the main control portion 1 as an operating frequency, only when the above mentioned function control processes (1) and (2) are conducted. Otherwise, the clock supply portion 3 sets the frequency of the main control clock 23a as a non-operating frequency, as shown in FIG. 3.

During the communicating state in the prior art, the communicating frequency is always supplied to the main control portion 1 which is enough to conduct the above mentioned function control processes (1)~(5) as shown in FIG. 7. The state monitoring portion 11a of the present embodiment, on the other hand, sends the clock switching signal 22a to the clock supply portion 3 so that the clock supply portion 3 sets the frequency of the main control clock 23a supplied to the main control portion 1 as an non-operating frequency, only when the above mentioned function control processes (1)~(4) are conducted, as shown in FIG. 3.

In the prior art, the state monitoring portion 11 having the construction shown in FIG. 6 sets the communicating frequency of the main control clock 23 supplied to the main control portion 1, for example, as 12 MHz, and the non-communicating frequency, for example, as 10 MHz. This difference includes a margin of the display process and the key input process and so on in the non-communicating state. In the present embodiment, on the other hand, the state monitoring portion 11a having the construction shown in FIG. 1 sets the operating frequency of the main control clock 23a supplied to the main control portion 1, for example, as 12 MHz, and the non-operating frequency, for example, as 0.3 MHz. This difference is only required to operate the state monitoring portion 11a, which can realize more power-saving.

Alternatively, in the prior art, the main control clock 23 having the communicating frequency (12 MHz) is supplied to the main control portion 1 all the time when the portable terminal is communicating as shown in FIG. 7. On the other hand, in the present embodiment, the main control clock 23a having the non-operating frequency (0.3 MHz) is supplied if the above mentioned function control processes (1)~(4) are not operating even if the state is in the communicating state as shown in FIG. 3. Since the main control clock 23a having the operating frequency (12 MHz) is supplied only for a shorter time, which can provide more power-saving portable terminal.

As explained above, in this portable terminal of the first embodiment, the state monitoring portion 11 a monitors the starting of the software processes of the main control portion 1, and send the clock switching signal 22a to the clock supply portion 3 so that the clock supply portion 3 sets the frequency of the main control clock 23a having the operating frequency which is supplied to the main control portion 1, when the above mentioned function control processes (1)~(4) are conducted in the main control portion 1. Alternatively, the state monitoring portion 11a sends the clock switching signal 22a to the clock supply portion 3 so that the clock supply portion 3 sets the frequency of the main control clock 23a having the non-operating frequency which is supplied to the main control portion 1, when the above mentioned function control processes (1)~(4) are not conducted in the main control portion 1. In other words, the main control clock 23a having the operating frequency is supplied only when the main control portion 1 requires the operating frequency to conduct the above mentioned function control processes (1)~(4), by which the more power-saving portable terminal than the prior art can be provided. It is also possible to decrease the non-operating frequency which at least allows the state monitoring portion 11 to conduct the above mentioned state monitoring process of the function control process (5), by which the more power-saving portable terminal can be provided.

Although only one operating frequency of the main control clock 23a is used in the first embodiment, the more power-saving portable terminal can be provided, by setting a plurality of minimum frequencies which are necessary for the microprocessor to conduct the above mentioned respective function control processes (1)~(4), and by selectively supplying the main control clock 23a having any one of the plurality of minimum frequencies to the main control portion 1 according to the operation of respective software of the function control processes (1)~(4).

Embodiment 2

Figure 4:
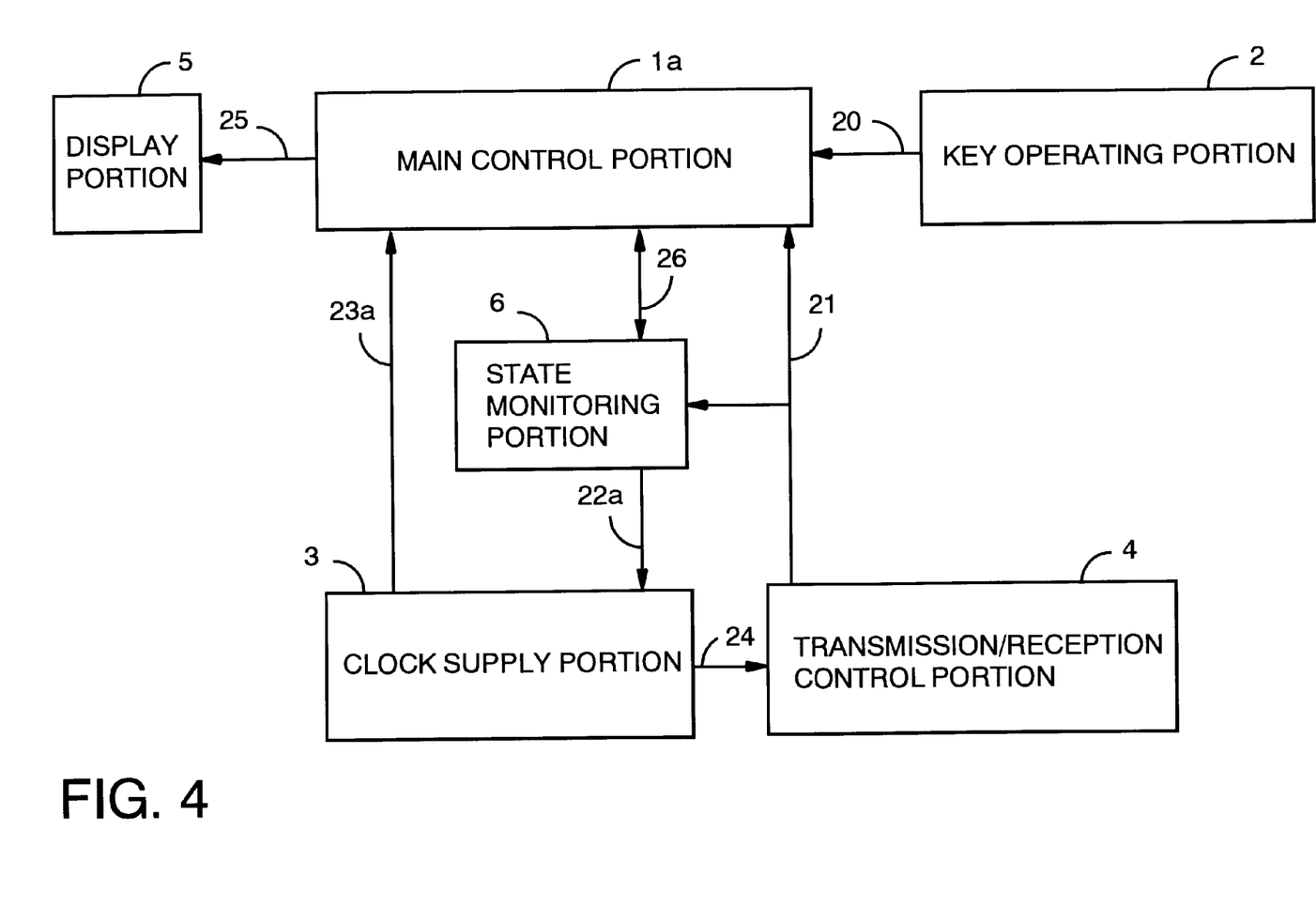
FIG. 4 is a block diagram showing a construction of a portable terminal of a second embodiment of the present invention.
Figure 5:
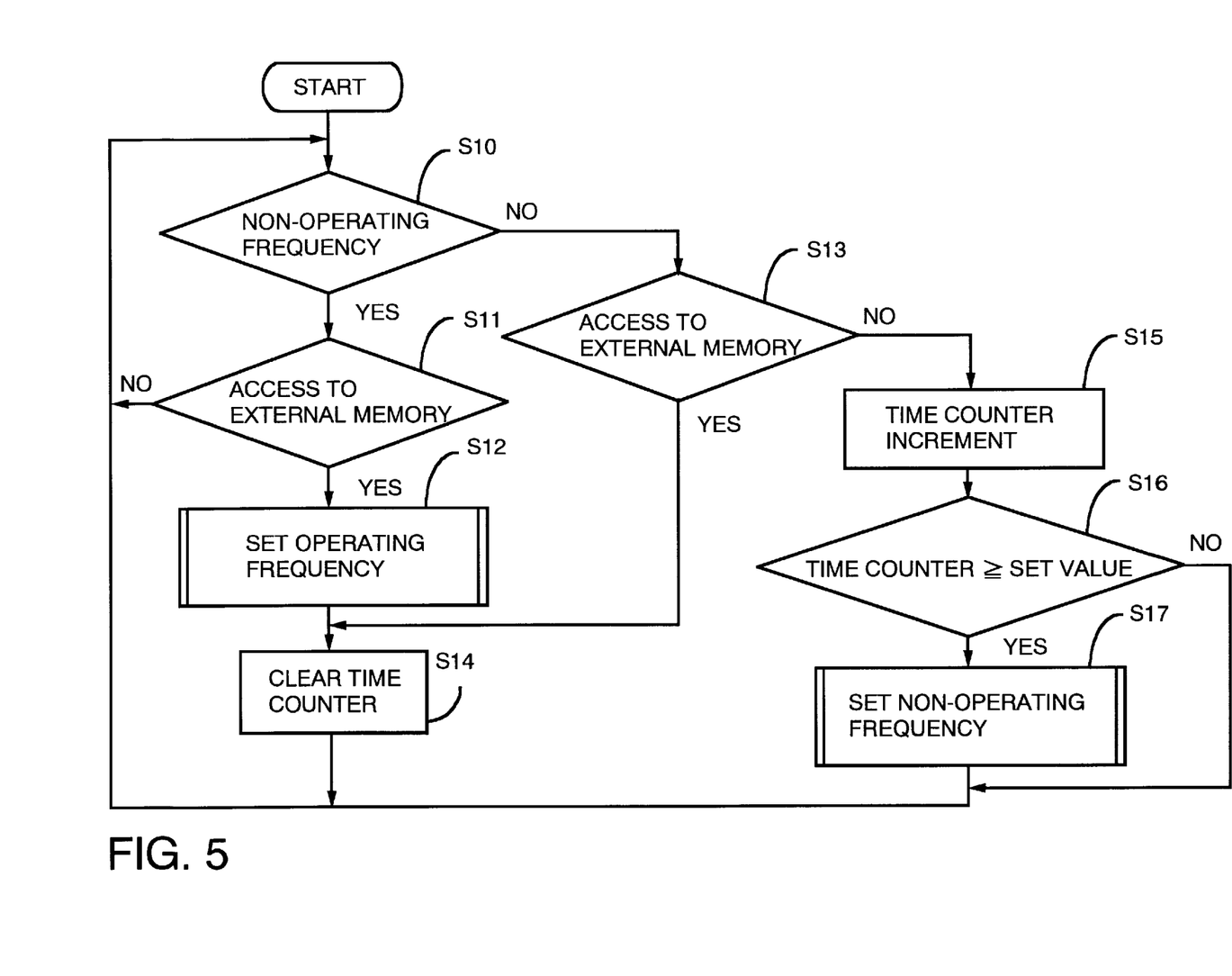
FIG. 5 is a flow chart for explaining an operation of a state monitoring portion shown in FIG. 4.

FIG. 4 is a block diagram which shows a construction of a portable terminal of a second embodiment of the present invention. Elements commonly numbered in FIG. 4 and FIG. 1 are not provided with a detailed explanation here, because those elements are described above in connection with FIG. 1. The portable terminal of FIG. 4 is different from that of FIG. 1 in that a state monitoring portion 6 is located outside of a main control portion 1a and monitors a state of software processes conducted by the main control portion 1a. In FIG. 4, an external memory access signal 26 is outputted from the microprocessor in the main control portion 1a to inform the state monitoring portion 6 of a state of an external memory (not illustrated) which is accessed by the microprocessor in the main control portion 1a, when one of above mentioned function control processes (1)~(4) is conducted by the main control portion 1a. Here, in the external memory, many kinds of addresses are assigned for a working area (not illustrated) where variables are stored, which are accessed by the operation of the function control processes (1)~(4), for a device driver (not illustrated) for a display portion used for outputting a display signal 25 to the display portion 5, and for a device driver (not illustrated) for a key operating portion used for inputting a key input signal 20 from a key operating portion 2. FIG. 5 is a flow chart for explaining an operation of the state monitoring portion 6.

Next, an operation of the portable terminal is explained below. Regarding a frequency switching of a transmission/reception clock 24 supplied to a transmission/reception control portion 4 to one of a receivable frequency and a communicable frequency, which is conducted by the state monitoring portion 6 via a clock switching signal 22a as shown in FIG. 4, is the same as that in FIG. 1 The state monitoring portion 6 in FIG. 4 is different from the state monitoring portion 11a of FIG. 1 in that how to switch the frequency of the main control clock 23a, which is supplied to the main control portion 1, to the main control portion 1a. In other words, the state monitoring portion 11a of FIG. 1 shares the microprocessor with the main control portion 1, and the state monitoring portion 11a monitors starting of the function control processes (1)~(4) conducted by the microprocessor in the main control portion 1 and switches the frequency according to the starting of the function control processes (1)~(4). On the other hand, the state monitoring portion 6 of FIG. 4 monitors the external memory access signal 26 for informing whether the microprocessor in the main control portion 1a accesses the external memory and switches the frequency according to the accessing the external memory. This operation is explained below using FIG. 5.

At a step S10, the state monitoring portion 6 judges whether the frequency of the main control clock 23a supplied to the main control portion 1a is a non-operating frequency, and when it is the non-operating frequency, it goes to a step S11, and when it is not the non-operating frequency, it goes to a step S13. At the step S11, the state monitoring portion 6 monitors whether the main control portion 1 accesses the external memory, and the state goes to a step S12 when the main control portion 1 accesses the external memory, and the state goes to the step S10 when the main control portion 1 is not accessing the external memory.

At the step S12, the state monitoring portion 6 judges that one of the above mentioned function control processes (1)~(4) is conducted by the main control portion 1a, sends the clock switching signal 22a to the clock supply portion 3 so that the clock supply portion 3 sets the frequency of the main control clock 23a to the operating frequency, and supplies it to the main control portion 1a, then goes to a step S14. At the step S13, the state monitoring portion 6 judges from the external memory access signal 26 whether the main control portion 1a accesses the external memory, and the state goes to a step S14 when the external memory has been accessed, while the state goes to a step S15 when the external memory has not been accessed.

At a step S14, the state monitoring portion 6 clears a time counter (not illustrated) which counts the time when the external memory is not accessed, and the state goes to the step S10. At a step S15, the state monitoring portion 6 increments the time counter, and the state goes to a step S16. At the step S16, the state monitoring portion 6 judges whether the time counter is equal to a predetermined set value or more, which is a reference value for judging whether the main control portion 1 is not operating. The state goes to a step S17 when the time counter is equal to the predetermined set value or more, while the state goes to the step S10 when the time counter is less than the predetermined set value. At the step S17, the state monitoring portion 6 judges that none of the above function control processes (1)~(4) is conducted by the main control portion 1a, and sends the clock switching signal 22a to the clock supply portion 3 so that the clock supply portion 3 sets a frequency of the main control clock 23a supplied to the main control portion 1a to a non-operating frequency, then the state goes to the step S10.

In the operation as explained above, in the portable terminal of the second embodiment, the state monitoring portion 6 monitors the operation of the main control portion 1a by judging whether the microprocessor in the main control portion 1a accesses the external memory. When the main control portion 1a accesses the external memory, the state monitoring portion 6 assumes that one of above mentioned function control processes (1)~(4) is operating and sends the clock switching signal 22a to the clock supply portion 3 so that the clock supply portion 3 sets the frequency of the main control clock 23a to an operating frequency. On the other hand, when the state monitoring portion 6 judges that none of the above mentioned function control processes (1)~(4) is operating, the state monitoring portion 6 sends the clock switching signal 22a to the clock supply portion 3 so that the clock supply portion 3 sets the frequency of the main control clock 23a to a non-operating frequency. According to the above manner, it is not necessary to monitor the starting of the software generated by the above mentioned function control processes (1)~(4) conducted by the main control portion 1a as shown in FIG. 2, and the processes are simplified.

Although the frequency of the main control clock 23a is switched to one of the operating frequency and the non-operating frequency in timing with accessing the external memory of the main control portion 1a, it is also possible to monitor the starting of the above mentioned function control processes (1)~(4) using also the key input signal 20 from the key operating portion 2 and a state informing signal 21 from the transmission/reception control portion 4.

What is claimed is:

1. A portable terminal in which its clock frequency is switched, comprising:
    a main controlling portion having a software processing portion using a microprocessor in said main controlling portion according to an interruption, said microprocessor including an operating system for driving software in said software processing portion and generating an interrupt signal,
    a clock supply portion for supplying to said main controlling portion a clock signal which causes said microprocessor to operate, and
    a state monitoring portion for monitoring, via the interrupt signal received from the operating system, an operating state of said software processing portion, wherein
        said state monitoring portion sends a clock switching signal to said clock supply portion so that said clock supply portion sets a frequency of said clock signal to a high frequency when said software processing is being conducted and sets a frequency of said clock signal to a low frequency when said processing is not being conducted and
        when no processing is conducted by said microprocessor for said software processing portion, the clock supply portion sets the clock frequency to a minimum, said minimum being below the operating frequency of the software processing portion but high enough for said state monitoring portion to operate.

2. The portable terminal according to claim 1 wherein said state monitoring portion changes said clock frequency up and down according to respective software operating load caused by said software processing portion.

3. The portable terminal according to claim 1 wherein said state monitoring portion shares a microprocessor with said software processing portion.

4. The portable terminal according to claim 1, wherein said minimum clock frequency is below 1 MHz.

5. The portable terminal according to claim 1, wherein said minimum clock frequency is 0.3 MHz.

6. The portable terminal according to claim 2 wherein said state monitoring portion shares a microprocessor with said software processing portion, and when no processing are conducted by said microprocessor for said software processing portion, the clock supply portion sets the minimum clock frequency which is enough for said state monitoring portion to operate.

7. A portable terminal in which its clock frequency is switched, comprising:
    a main controlling portion having a software processing portion using a microprocessor in said main controlling portion according to an interruption, said microprocessor including an operating system for driving software in said software processing portion and generating an interrupt signal,
    a clock supply portion for supplying to said main controlling portion a clock signal which causes said microprocessor to operate, and
    a state monitoring portion for monitoring, via the interrupt signal received from the operating system, whether the microprocessor accesses an external memory, wherein
        said state monitoring portion sends a clock switching signal to said clock supply portion so that said clock supply portion sets a frequency of said clock signal to a high frequency when the microprocessor accesses an external memory and sets a frequency of said clock signal to a low frequency when said microprocessor does not access the external memory and
        when no memory accesses or software processing is conducted by said microprocessor for said software processing portion, the clock supply portion sets the clock frequency to a minimum, said minimum being below the operating frequency of the software processing portion but high enough for said state monitoring portion to operate.

8. The portable terminal according to claim 7 wherein said clock supply portion sets the minimum clock frequency which is enough for said state monitoring portion to operate, when the microprocessor does not access the external memory.

9. A power saving portable telephone having a communication state and a non-communication state comprising:
    a main controlling portion having a software processing portion using a microprocessor in said main controlling portion according to an interruption, said microprocessor including an operating system for driving software in said software processing portion and generating an interrupt signal;
    a clock supply portion for supplying to said main controlling portion a clock signal which causes said microprocessor to operate wherein said clock signal frequency is adjustable; and
    a state monitoring portion for monitoring, via the interrupt signal received from the operating system, an operating state of said software processing portion, said state monitoring portion sends a clock switching signal to said clock supply portion so that said clock supply portion sets a frequency of said clock signal to high when said software processing is being conducted and sets a frequency of said clock signal to minimum when said processing is not being conducted, wherein
        the setting of said clock frequency to high or minimum is independent of whether the telephone is in the communication state or non-communication state.

10. The portable telephone according to claim 9, wherein said minimum clock frequency is below 1 MHz.

11. The portable telephone according to claim 9, wherein said minimum clock frequency is 0.3 MHz.

* * * * *